United States Patent [19]

Muramatsu

[11] Patent Number: 4,579,796
[45] Date of Patent: Apr. 1, 1986

[54] ORGANIC CELL
[75] Inventor: Hiromochi Muramatsu, Nagoya, Japan
[73] Assignee: Nippondenso Co., Ltd., Kariya, Japan
[21] Appl. No.: 629,455
[22] Filed: Jul. 10, 1984
[30] Foreign Application Priority Data Jul. 11, 1983 [JP] Japan ................................ 58-125798

[51] Int. Cl.[4] ............................................. H01M 6/16
[52] U.S. Cl. ..................................... 429/198; 429/199; 252/62.2
[58] Field of Search ............... 429/198, 194, 213, 199; 252/62.2

[56] References Cited

U.S. PATENT DOCUMENTS

| | | | |
|---|---|---|---|
| 3,928,070 | 12/1975 | Gunther | 429/198 X |
| 4,302,520 | 11/1981 | Evans et al. | 429/194 |
| 4,463,071 | 7/1984 | Gifford et al. | 429/198 X |
| 4,482,616 | 11/1984 | Connolly et al. | 429/194 X |

Primary Examiner—Charles F. LeFevour
Attorney, Agent, or Firm—Cushman, Darby & Cushman

[57] ABSTRACT

Lives of organic secondary cells having organic electrodes wherein organic conductive materials such as polyacetylene are used as electroactive substance for the cathodes and/or anodes can be extended in the following way: Active species which are produced, when organic electrodes are doped with excess ions, and are responsible for the deterioration of cell functions are trapped with a substance having a frontier-electron density higher than those of the organic conductive materials, such as dimethylimidazolidinone, toluene, diphenylamine and dimethylaniline, by adding the substance to electrolyte, such as a solution of lithium perchlorate in propylene carbonate, of the cells.

1 Claim, 4 Drawing Figures

ORGANIC CELL

BACKGROUND OF THE INVENTION

The present invention relates to organic secondary cells having organic electrodes wherein organic conductive materials such as polyacetylene are used as electroactive substance for the positive electrodes (cathodes) and/or the negative electrodes (anodes). More particularly, the invention relates to improvements in electrolytes for use in organic secondary cells.

Organic secondary cells operate in the manner so that the organic electrodes during charge are doped with ions of the electrolyte which consists of, for example, a solution of lithium perchlorate in propylene carbonate, and the doped ions during discharge effuse into the electrolyte to cause an electric current through the external circuit. However, when the organic electrodes are doped with excess of such ions by overcharge or the like, these ions dissociate into active species, for example, free radicals, which will react with the organic electrodes to lower the conductivity thereof, thus deteriorating cell functions.

SUMMARY OF THE INVENTION

An object of the invention is to extend lives of organic cells through preventing the organic electrodes of the cells from reacting with the above-noted active species which are responsible for the deterioration of cell functions, by adding a substance which will trap such active species, to the electrolyte (hereinafter the original electrolyte is referred to as the mother electrolyte).

According to the invention, there is provided an electrolyte for organic secondary cells having organic electrodes wherein organic conductive materials are used as electroactive substance for the positive electrodes and/or the negative electrodes, which comprises a mother electrolyte and an additive which has a frontier-electron density higher than those of the organic conductive materials.

DETAILED DESCRIPTION OF THE INVENTION

Figure 1:
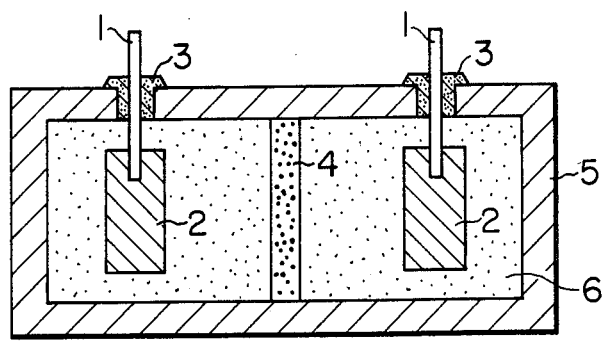
FIG. 1 is a schematic diagram showing the structure of an organic secondary cell pertaining to the invention.

As a result of infrared absorption spectroscopy and surface analysis, the present inventors found out that active species produced by excessive ion doping of an organic electrode are liable to react with $\pi$-bonds of the organic conductive electrode material, and invented a method for preventing the reaction, which comprises the addition to the mother electrolyte a substance higher in $\pi$-electron density, more specifically in frontier electron density, than the organic conductive material.

According to the invention, the reaction of active species with the organic conductive material can be prevented, since the additive is more liable to react with those active species than the organic conductive material, and in consequence the drop in the conductivity thereof can be prevented and the cell life can be improved to a great extent.

Referring now to the drawings, the invention is described in detail.

In FIG. 1, the numeral 1 represents outgoing electrodes (terminals) consisting of a conductor, such as a metal, e.g. Ni, Al, or Ti or an inorganic polymer, e.g. carbon fiber, which does not dissolve in the electrolyte 6 during charge or discharge. The conductor may be either a simple substance or a composite like a conductive rubber. The numeral 2 represents a cathode and an anode, at least one of which consists of an organic conductive material such as polyacetylene or polypyrrole. Other organic conductive materials such as poly(p-phenylene) and polythiophene also can be used as the electrode material. When such an organic conductive material is used for only one of the electrodes, the other electrode may consist of an inorganic conductive material inert to the electrolyte 6. Such materials include metals, e.g. Ni, Al, and Pt and other inorganic conductors, e.g. graphite and carbon fiber. At least one side of the organic electrode can be covered with a thin layer of metal according to the method for making electrodes of organic cells described in Japanese Pat. Application No. 120,770/82, which was filed by the present applicant. This method comprises forming a thin layer of metal on at least a part of at least one side of an organic electrode at a temperature where the organic electrode does not degrade, and then forming an atomic mutual diffusion layer between the thin metal layer and the organic electrode sheet by the recoil-ion implantation method. The numeral 3 represents plugs for sealing the holes through which the outgoing electrodes penetrate. These plugs may consist of any of materials including the same one as used for the cell case 5 which will be stated below, other resins, and metals, provided that the material can maintain the complete air-tightness as well as the insulation of the two electrodes from each other. The numeral 4 represents a separator that prevents both electrodes from touching each other and is permeable to ions of the electrolyte 6. The separator 4 consists of a nonwoven fabric of polypropylene, a glass filter, or the like. The cell case 5 may consist of any material inert to the electrolyte 6. Suitable materials for the cell case 5 include insulators, e.g. polypropylene and Teflon, of course, and also conductors, e.g. aluminum and stainless steel provided that the insulation from the outgoing electrodes is secured. The electrolyte 6 consists of a mother electrolyte and an additive. The mother electrolyte is a solution of electrolyte in a nonaqueous solvent. In the following Example, a solution of lithium perchlorate in propylene carbonate was used as the mother electrolyte. Electrolyte usable herein also include other compounds such as lithium borofluoride, which do not react with the organic electrode and dissociate into ions in the nonaqueous solvent. While propylene carbonate was used as the nonaqueous solvent in the following Example, other solvents such as γ-butyrolactone and tetrahydrofuran can be used as well.

Figure 2:
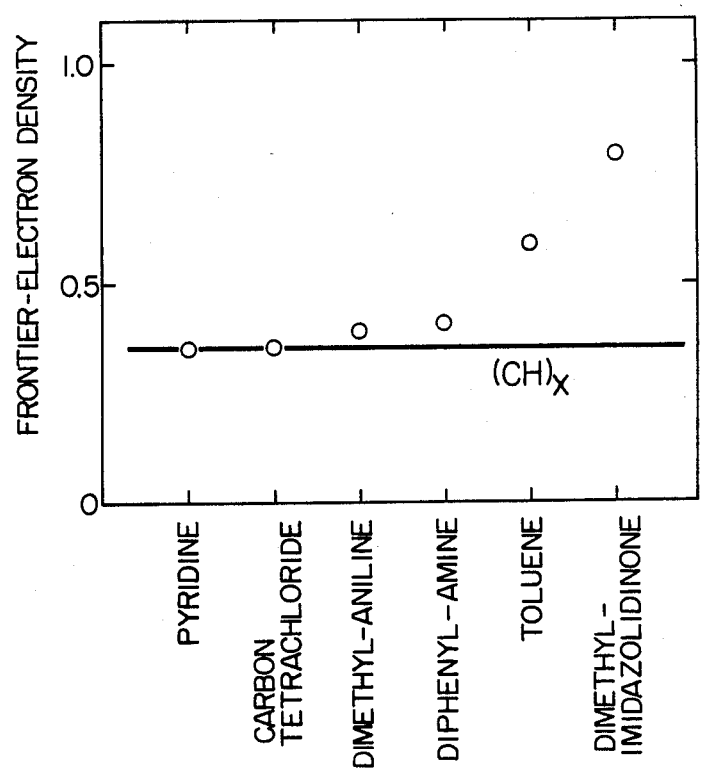
FIG. 2 shows frontier-electron densities of organic compounds including additives for use in the electrolyte of the invention.

The additive to be incorporated in the mother electrolyte in the invention is an electron donative substance or an electron-donative-group containing substance and has a frontier-electron density higher than that of the organic electrode material. Examples of the additive are dimethylimidazolidinone, toluene, diphenylamine, and dimethylaniline, frontier-electron densities of which are shown in FIG. 2.

When polyacetylene is used as the organic conductor for an electrode, dimethylimidazolidinone, toluene, diphenylamine, and dimethylaniline, which have a frontier-electron density of higher than 0.35 are suited as the additive since the frontier-electron density of polyacetylene is 0.35. Other substances can also be used as the additive, provided that they have frontier-electron density higher than that of the organic electrode material used. The additive may consist of either one component or a mixture of plural components.

The invention is illustrated in more detail referring to the following Example:

EXAMPLE

An electrolyte was prepared by adding 1 vol % of dimethylimidazolidinone, highest in frontier-electron density among the compounds shown in FIG. 2, to a 1 M solution (mother electrolyte) of lithium perchlorate in propylene carbonate. An organic cell was constructed using the above prepared solution as the electrolyte, polyacetylene for the cathode, and aluminum for the anode. For comparison, similar organic cells were constructed without using any additive and with using as additive 1 vol % of carbon tetrachloride which accelerates the reaction of active species with polyacetylene, respectively.

These organic cells were subjected to an accelerated endurance test, wherein charging and discharging conditions were as follows: Each cell was charged at a constant current density of 1 mA/cm$^2$ to a charge quantity of 4 C/cm$^2$ and then discharged through a resistance of 110 Ω to a voltage of 1 V. This process corresponds to one charge-discharge cycle.

Figure 3:
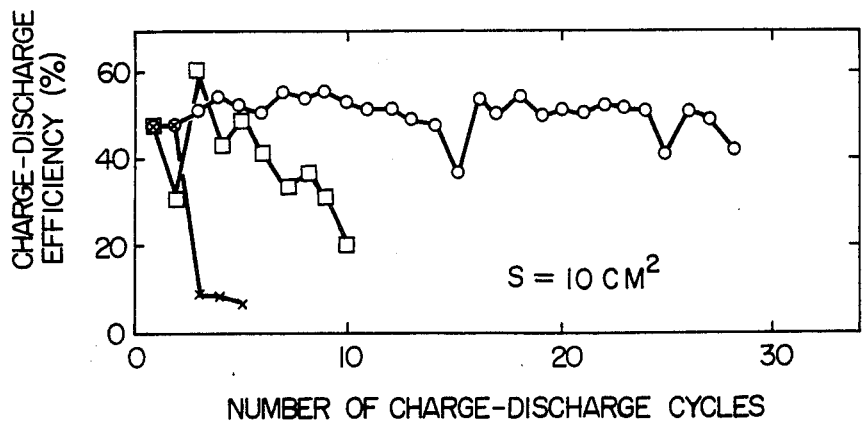
FIG. 3 is a graph showing the relation between the charge-discharge efficiency (%) and the number of charge-discharge cycles determined on organic cells pertaining to the invention.
Figure 4:
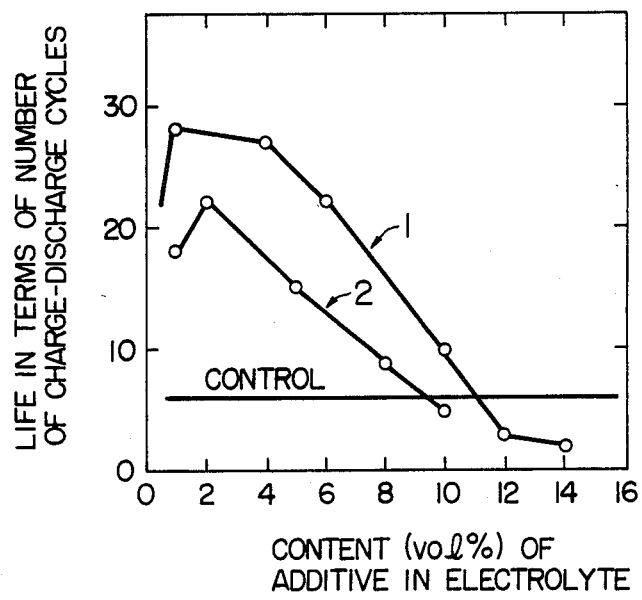
FIG. 4 is a graph showing the relation between the life of organic cells pertaining to the invention and the additive content (vol %) in electrolyte of the cells, where the life is represented by the number of charge-discharge cycles repreated before the charge-discharge efficiency drops below 40%. In this figure, curves 1 and 2 were obtained when dimethylimidazolidinone and toluene were used as additives, respectively.

The results were as shown in FIG. 3, wherein the number on the ordinate indicates the charge-discharge efficiency (%) and the number on the abscissa indicates the number of charge-discharge cycles. In the figure, curve–O–O–is of the case where dimethylimidazolidinone was added, curve –□–□–of the case where no additive was used, and curve–x–x–of the case where carbon tetrachloride was added. The results showed that the life of the cell containing 1 vol % of dimethylimidazolidinone as additive to the mother electrolyte was 3 times as long as that of the control cell (containing no additive). Also when other additives toluene, diphenylamine, and dimethylaniline were incorporated respectively, lives of the cells were much extended as compared with the control cell. The suitable amount of additive cannot be absolutely specified since it of course varies with the kinds of mother electrolyte used and of additive itself. However, when a 1 M solution of LiClO$_4$ in propylene carbonate as the mother electrolyte and polyacetylene as the organic electrode material are used, suitable amounts of additives are up to 10% by volume as shown in FIG. 4. In this figure, the number on the ordinate indicates a measure of cell life, that is, the number of charge-discharge cycles repeated before the charge-discharge efficiency drops below 40%, and the number on the abscissa indicates the amount (vol %) of additive incorporated. Curves 1 and 2 were obtained when dimethylimidazolidinone and toluene were used as additives, respectively.

What is claimed is:

1. An electrolyte for organic secondary cells having organic electrodes wherein organic conductive materials are used as the electroactive substance for the cathodes and/or the anodes, which electrolyte consists essentially of a solution of lithium perchlorate in a nonaqueous propylene carbonate solvent as a mother electrolyte and dimethylimidazolidinone as a cosolvent additive which has a frontier-electron density higher then those of the organic conductive materials, the dimethylinidazolidinone additive preventing the reaction of active species formed by dissociation of the mother electrolyte with the organic conductive material of the organic electrodes.

* * * * *